No. 814,773. PATENTED MAR. 13, 1906.
H. L. DIXON & G. A. MARSH.
METHOD OF FEEDING GLASS.
APPLICATION FILED DEC. 5, 1904. RENEWED AUG. 1, 1905.
5 SHEETS—SHEET 1.
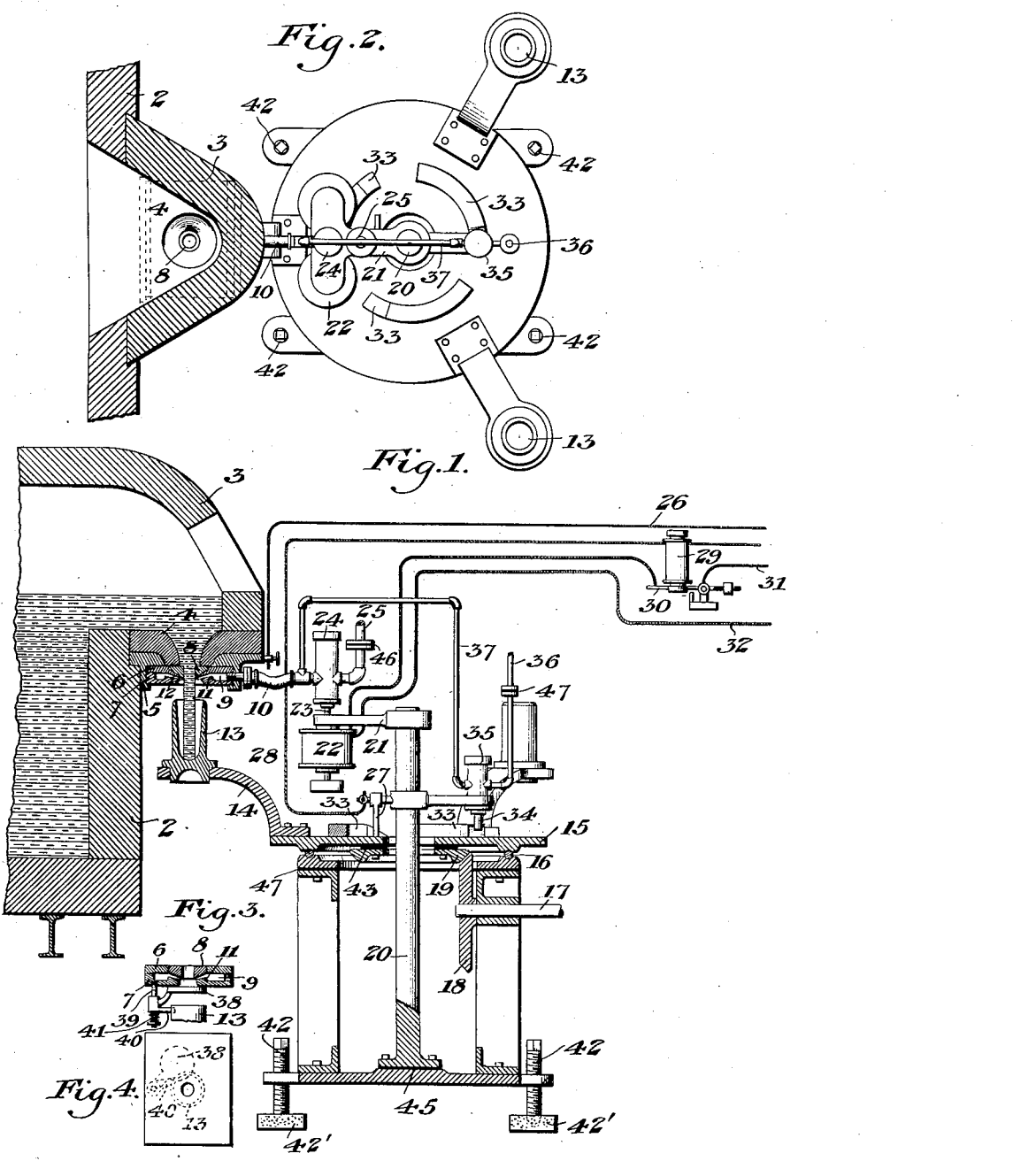
WITNESSES:
INVENTORS
H. L. Dixon
G. A. Marsh
BY
Bakewell Byrnes
ATTORNEYS.

No. 814,773. PATENTED MAR. 13, 1906.
H. L. DIXON & G. A. MARSH.
METHOD OF FEEDING GLASS.
APPLICATION FILED DEC. 5, 1904. RENEWED AUG. 1, 1905.
5 SHEETS—SHEET 2.
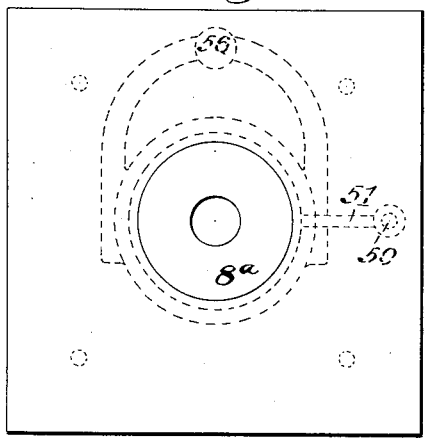
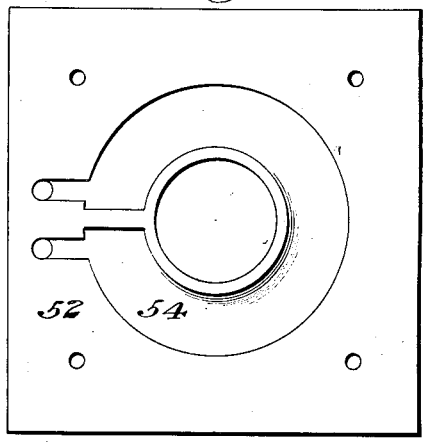
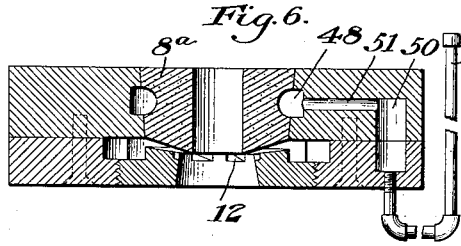
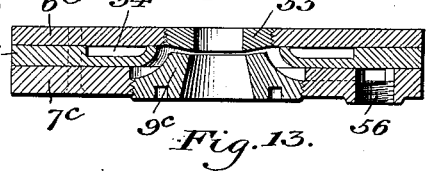
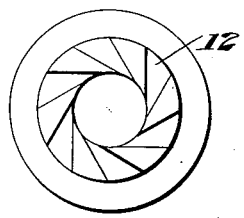
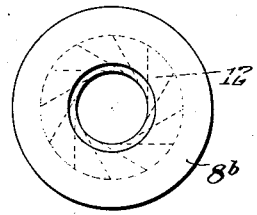
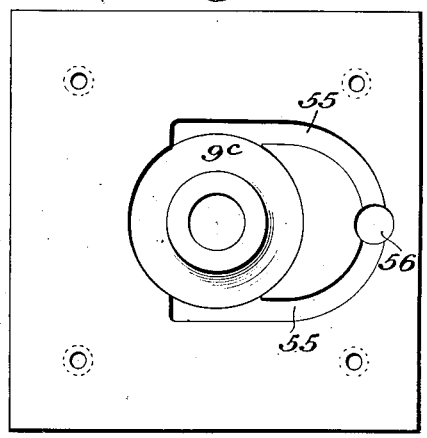
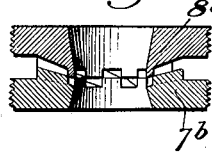
WITNESSES:
INVENTORS
H. L. Dixon
G. A. Marsh
BY
ATTORNEYS No. 814,773. PATENTED MAR. 13, 1906.
H. L. DIXON & G. A. MARSH.
METHOD OF FEEDING GLASS.
APPLICATION FILED DEC. 5, 1904. RENEWED AUG. 1, 1905.
5 SHEETS—SHEET 3.
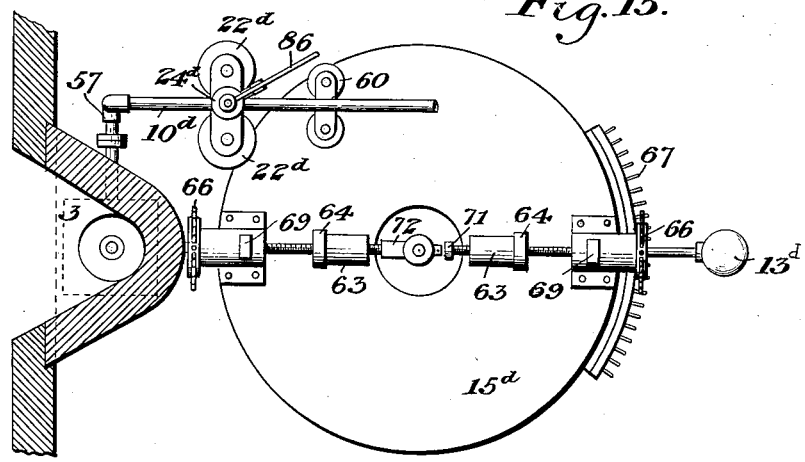
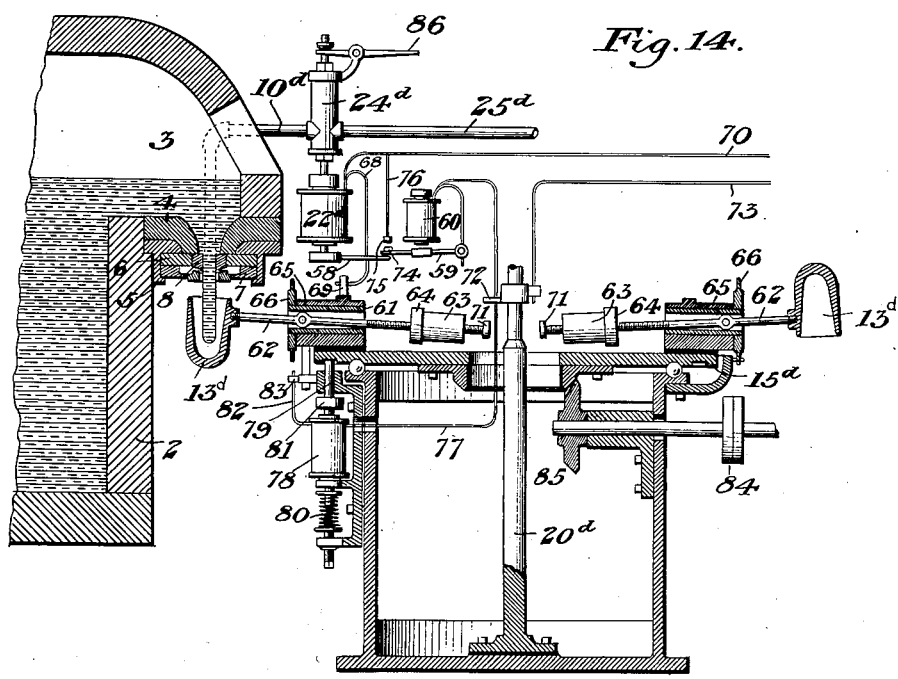
WITNESSES:
INVENTORS
BY
ATTORNEYS No. 814,773. PATENTED MAR. 13, 1906.
H. L. DIXON & G. A. MARSH.
METHOD OF FEEDING GLASS.
APPLICATION FILED DEC. 5, 1904. RENEWED AUG. 1, 1905.

5 SHEETS—SHEET 4.

WITNESSES:

INVENTORS
H. L. Dixon
G. A. Marsh
BY
Bakewell Byrnes
ATTORNEYS

No. 814,773. PATENTED MAR. 13, 1906.
H. L. DIXON & G. A. MARSH.
METHOD OF FEEDING GLASS.
APPLICATION FILED DEC. 5, 1904. RENEWED AUG. 1, 1905.
5 SHEETS—SHEET 5.
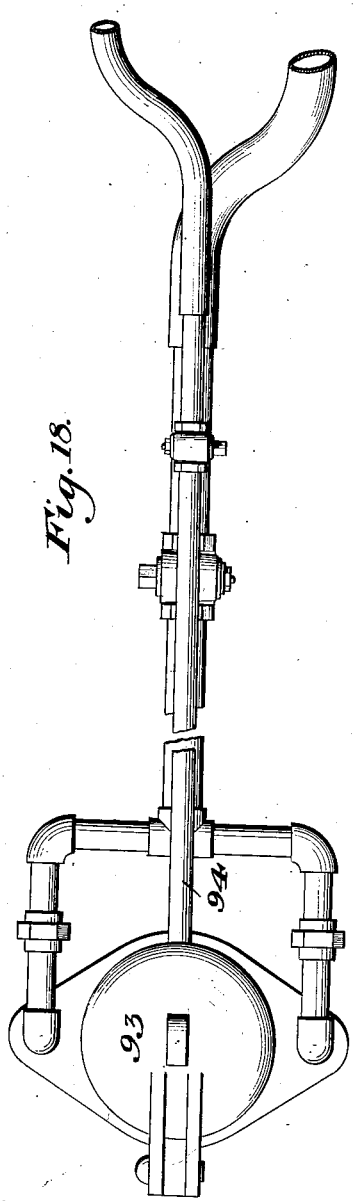
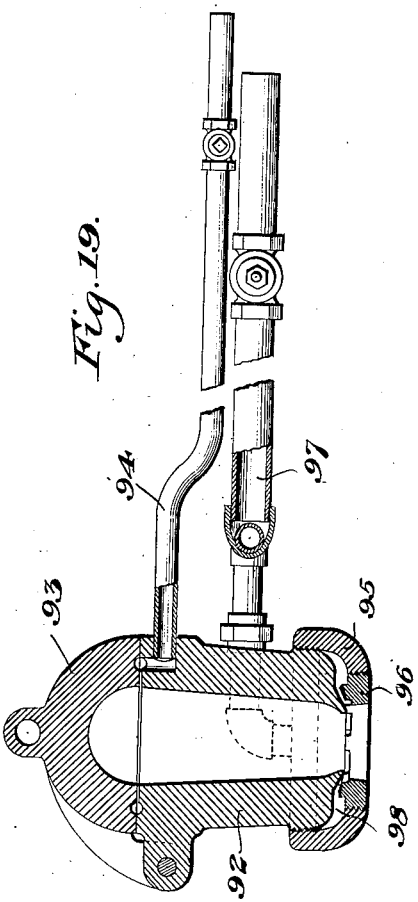
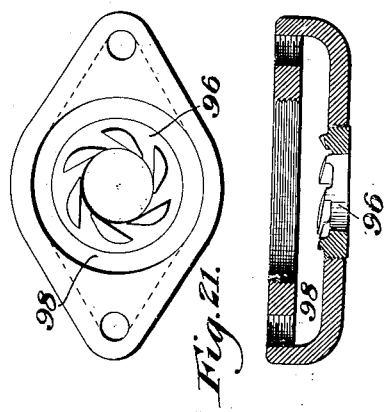
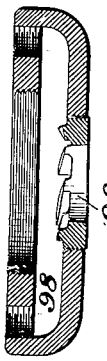
WITNESSES:
INVENTORS
H. L. Dixon
G. A. Marsh
BY Bakewell Byrnes
ATTORNEYS

UNITED STATES PATENT OFFICE.

HENRY L. DIXON AND GEORGE A. MARSH, OF PITTSBURG, PENNSYLVANIA, ASSIGNORS TO AUTOMATIC MACHINE GLASS COMPANY, OF PITTSBURG, PENNSYLVANIA, A CORPORATION OF PENNSYLVANIA.

METHOD OF FEEDING GLASS.

No. 814,773.  Specification of Letters Patent.  Patented March 13, 1906.

Application filed December 5, 1904. Renowed August 1, 1905. Serial No. 272,194.

*To all whom it may concern:*

Be it known that we, HENRY L. DIXON and GEORGE A. MARSH, of Pittsburg, Allegheny county, Pennsylvania, have invented a new and useful Method of Feeding Glass, of which the following is a full, clear, and exact description, reference being had to the accompanying drawings, forming part of this specification, in which—

Figure 17:
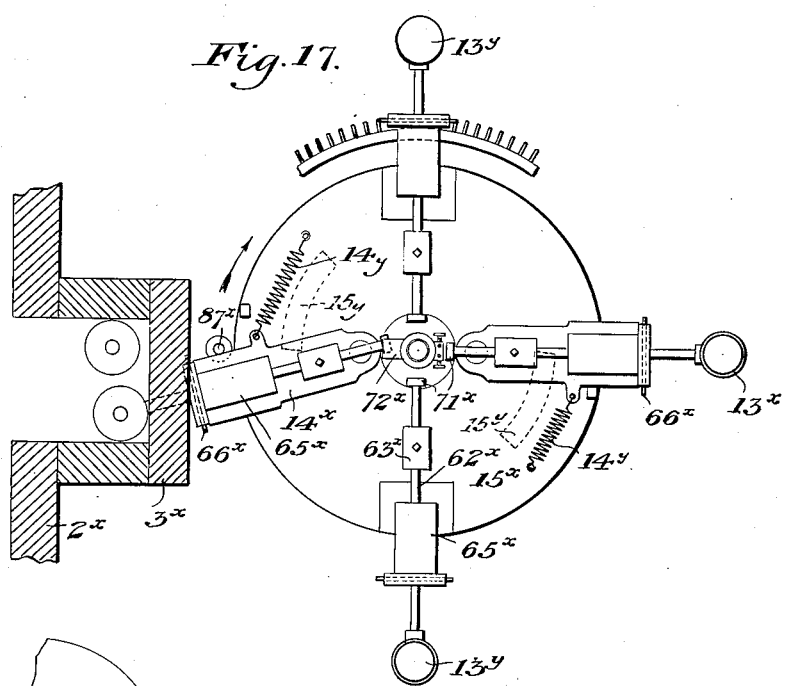
Figure 16:
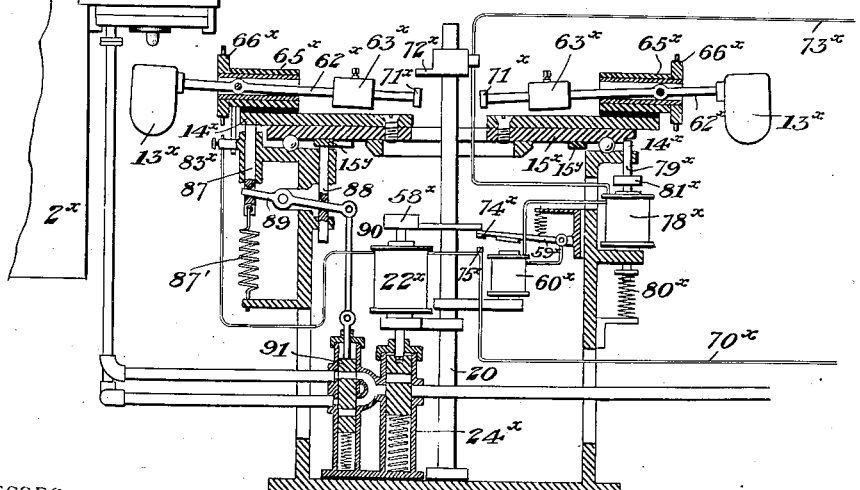

Figure 1 is a sectional side elevation showing one form of apparatus for carrying out our invention. Fig. 2 is a sectional top plan of the same. Figs. 3 and 4 are detail views of the shutter. Fig. 5 is an enlarged detail plan view of the cut-off plate. Fig. 6 is a central cross-section of the same. Figs. 7 and 8 are detail views of the blow-out. Figs. 9 and 10 are similar detail views showing another form of the blow-off. Fig. 11 is a vertical cross-section showing another form of blow-off plate. Fig. 12 is a top plan view of the middle plate of Fig. 11. Fig. 13 is a top plan view of the lower plate. Fig. 14 is a view similar to Fig. 1, showing a modified form of apparatus. Fig. 15 is a sectional top plan view of Fig. 14. Fig. 16 is a sectional side elevation of another form of apparatus, and Fig. 17 is a sectional top plan of the same. Fig. 18 is a top plan of a gathering device arranged for carrying out our method. Fig. 19 is a sectional side elevation of the same, and Figs. 20 and 21 are detail views of the blow-off plate of Figs. 18 and 19.

Our invention relates to the feeding of glass in separated portions from a furnace or receptacle into molds or small cups or receptacles.

The object of the invention is to provide an improved method for cuting off the glass taken from the furnace or receptacle without crizzling the glass and without forming threads or portions which will injure the appearance of the article formed from the portion of glass cut off.

To that end our invention consists in cutting off the glass by directing against it a current of fluid, preferably a gaseous fluid, such as air, superheated steam, &c.

The invention also consists in simultaneously directing the fluid against a stream of glass on different sides thereof, and, further, in driving the fluid against the stream in such a manner as to cause a swirl, and thus give a twisted action, which will rapidly and effectually sever the stream.

The invention further consists in opening a quick-acting air-valve which will direct the gaseous blast against the stream and then automatically cutting it off, and, further, in the combinations of steps hereinafter described and claimed.

In the drawings, referring to the form of Figs. 1 to 4, inclusive, 2 represents a glass-tank furnace, which is provided with a small forehearth or projecting portion 3, overhanging one end of the furnace. The glass lies in this forehearth at such a height as to give a small head to the glass to cause it to flow down through the outlet in the bottom. The bottom of this forehearth may be made of refractory material or metal, as shown at 4, and is provided with a downwardly-tapering hole. This refractory bottom is supported on an iron or steel plate 5, having a larger hole through which the downward extension of the refractory material extends. The iron plate 5 is provided with internal side grooves or guideways open at its ends and into which slides the blow-off device. This blow-off device consists of a metal plate or plates arranged with a central hole and a slit surrounding the hole, through which air is forced under pressure to cut off the glass. In the blow-off devices shown in Figs. 1 to 4 two plates are used, 6 and 7, the upper plate having a hole arranged to receive a metal plug 8, which is preferably circular, and provided with a downwardly and inwardly inclined lower face of conical shape, which serves to give the entering air-blast a downward angle as it strikes the glass stream. The object of this is to prevent the air from blowing upwardly into the stream, and thus blasting the glass upwardly and within the forehearth, forming air-bubbles and injuring the glass. The lower plate 7 is preferably provided with side shoulders on which the top plate rests, leaving an annular cavity 9 between them into which the air may be led through a flexible connection 10. (Shown in Fig. 1.) Below the plug 8 the lower plate is provided with an annular boss 11, the upper face of which is also preferably inclined downwardly and inwardly to the central hole. In the preferred form of our invention where the swirling action is caused we form the boss 11 with a series of inclined or tangential air-passages 12, as shown in Figs. 6, 7, and 8, so that the air flows in under pressure in a non-radial direction and gives a twisting action to the glass stream, which greatly aids in cutting it off.

The stream of glass flowing down through the bottom of the forehearth and through the blow-off device may be received there in a mold or a cup. These molds or cups are preferably placed on an endless carrier, such as a rotary table, and are successively brought into position below the stream of glass. In Figs. 1 and 2 we have shown receiving-cups 13, which set in holes in arms 14, projecting from a rotary table 15. This table rests upon ball-bearings 16 and is rotated by a driving-shaft 17, having a bevel-wheel 18, intermeshing with a bevel-wheel 19, secured to the table. The gearing in this case is preferably of intermittent form, which will stop each cup as it comes into alinement with the stream of glass and again start the table into motion after a predetermined period of time.

In order to give a quick blast for cutting off, we preferably employ an electric valve system which will admit the blast after the proper amount of glass has passed through the blow-off device and then quickly shut off the blast. In the form shown a standard 20 extends vertically through a hole in the table and is provided with an arm 21, supporting an electromagnet 22, having an armature with a stem 23 connected to a piston-valve movable in a valve-casing 24. A spring is provided in the upper part of this casing, which normally forces the valve down to closed position, this valve controlling the air passing in through pipe 25. In this form the hot glass is used as a part of the circuit, so that as it contacts with the cup or mold the circuit will be completed and a high-tension current will actuate the electromagnet either directly or indirectly and open the valve against the pressure of the spring. As the hot glass is a poor conductor, we preferably employ a relay system, so that the small current passing through the glass will throw in a heavier current to actuate the valve. In the form shown the high-tension current passes in through the conductor 26 to the iron plate 5 and then through the plug and through the hot glass after it contacts with the cup. From the cup it passes to the table and thence through the sliding contact 27 and back through the conductor 28 and the relay 29. As the glass contacts with the cup the relay will be energized and will actuate the armature 30, and thus close the circuit through the conductor 31. A current of low tension and greater amperage will then pass through the wire 31, through the electromagnet 22, and back through the conductor 32. The magnet will then draw down its armature against the action of the spring for the valve and open the valve, admitting air under pressure to the blow-off device. As soon as this air cuts off the glass the high-tension current will be cut off, and this will in turn cut the low-tension circuit and deenergize the electromagnet, when the spring will at once snap the air-valve closed. A quick cutting-blast is thus admitted to and shut off from the glass. The table then begins to turn, and on it we provide a series of cams 33, which are the same in number as the cups and which as the cup which has been filled leaves the filling-point act upon the downwardly-projecting stem 34 of a spring-pressed air-valve 35, to which air is supplied at a lower pressure through pipe 36. The air passes from the valve through pipe 37, which leads into the main supply-pipe at a point between the valve 24 and the blow-off device. This air will act to support glass within the outlet-hole and prevent or retard its downward flow until the next cup has come into registry. As the next cup comes to the filling position the stem 34 drops off the cam and the low-pressure air is cut off. This low-pressure air system may or may not be employed, depending upon the speed of operation. If the table is turned rapidly and one cup is brought into place shortly after the filled cup leaves the filling position, this low-pressure system will not be necessary, as it takes a perceptible time for the glass to reach the level of the next cup after it has been cut off. If the operation is slower, we preferably use this low-pressure system, and we may also employ a shutter to hold the air-pressure within the blow-off device, and thus enable it to more effectually balance the head of the glass. Thus in Figs. 3 and 4 we show a horizontal oscillating shutter 38 mounted on a stem 39 and having an arm 40 arranged to contact with the cup as it comes to filling position. The shutter is normally held in closed position by a spring 41, and as the cup comes to place it forces the shutter to one side and opens the hole in the blow-off device at the same moment that the low-pressure air is cut off. As the cup leaves the filling position it releases the shutter, which closes as the low-pressure air is admitted, thus holding the pressure to balance the head of the glass. The table is preferably mounted upon adjusting-screws 42, which rest upon insulators 42', so that the cups may be adjusted toward and away from the cut-off. This adjustment of the cups with respect to the cut-off enables us to accurately regulate the amount of glass, since the amount of glass is determined by the distance between the cut-off and bottom of the cup, as the glass is severed at the cut-off the instant the glass entering the cup touches the bottom of the cup and completes the electric circuit, as previously described.

Insulation is provided at 43 between the bevel-wheel 19 and the table, also in the pipe 36 at 44, at the bottom of the standard 20, as shown at 45, at the joint 46 of pipe 25, and at the flexible connection 10, which is preferably of rubber. The track on which the table travels is also preferably insulated from the standards, as shown at 47.

In the form of blow-off device shown in Figs. 5 and 6 the plug $8^a$ is of porous material, such as wood or plaster, and a liquid, such as water, is supplied to this plug by an annular channel 48. The water is fed to this channel through the pipe 49 and passage-ways 50 and 51. This liquid will seep through the porous plug, and gases will be generated by the heat of the glass which will tend to protect the plug and lengthen its life. When the plug becomes injured in any of the forms, the blow-off device may be pushed out and a similar device pushed into place.

In the form of Figs. 9 and 10 in addition to providing the lower plate $7^b$ with the tangential air-slots we also form similar slots in the lower surface of the plug $8^b$. The slots of the plug are preferably staggered with those of the lower plate, as shown in Fig. 10, to increase the swirling action. This double set of slots is not necessary, however, as we have found that a single row of slots will effectually twist and cut off the glass stream.

In the form of Figs. 11, 12, and 13 a blow-off device is formed of three plates—namely, an upper plate $6^c$, a lower plate $7^c$, and intermediate plate 52. In this form a metal plug 53, of steel or other metal, is secured into the upper plate, while the intermediate plate is provided with a closed liquid-channel 54, through which a cooling fluid, such as water, is circulated. This channel is at such a distance from the plug and the glass that the plug will be maintained at such heat that the glass will not stick thereto and at the same time prevent chilling of the glass unduly. In this form, as in the other forms, the air is preferably supplied to the annular cavity $9^c$ by oppositely-extending channels 55, leading from the air-inlet hole 56.

In Figs. 14 and 15 the blow-off device may be the same as that of Figs. 1 and 2 except that the low-pressure air system is done away with, the electric valve is operated in a different manner, and the air-blast is fed in through a swivel-pipe at the end of the blow-off instead of the side. In this form the air-pipe $25^d$ leads to a spring-pressed piston-valve $24^d$, from which the air passes through pipe $10^d$ into an elbow connection 57 at the end of the blow-off device. This elbow may be turned to one side when the blow-off device is changed. In this form the electromagnet $24^d$ is connected to the valve, as before, while the armature carries an arm 58, arranged to act upon a swinging contact 59, which closes the circuit through another electromagnet 60.

In this form the rotary table $15^d$ is provided with turning sleeves 61, in each of which is pivoted an arm 62, carrying the cup $13^d$ at its outer end, while an adjustable weight 63 is provided upon its inner end. A lock-nut 64 holds its weight in adjusted position. Each table-sleeve 61 is mounted in a bearing 65 on the table and is provided with a toothed wheel 66, arranged to intermesh with teeth 67 at the opposite side of the table from the filling-point to automatically turn the cup over and drop the glass into a mold or receptacle. A wire 68, leading from the magnet $24^d$, carries a contact 69, arranged to slide upon a contact-boss on the bearing 65. The current enters this electromagnet through the conductor 70. When the glass enters the cup and in a sufficient quantity to tilt the arm 62 against the action of the weight, a contact 71 on the arm engages a stationary contact 72 on the standard $20^d$ and completes the main circuit through the conductor 73, leading from the contact 72. As soon as the main circuit is completed the arm 58 is drawn up and causes a contact 74 on the arm 59 to engage a contact 75 on a branch conductor 76 leading from the conductor 70. The current then flows through the branch 76 and the electromagnet 60, which is of less resistance than the magnet $24^d$, and from the magnet 60 it passes through conductor 77 to an electromagnet 78, whose stem 79 has been engaged with a hole in the under side of the table. This stem is pressed into the hole by a spring 80, and when the circuit is completed through the magnet its armature 81 is drawn down against the action of the spring, so as to release the locking-stem. The magnet 78 is secured to the standard on which the table turns, and a conductor 82 leads from it to a contact 83, arranged to slide upon the bearing for the cup-arm. This contact comes into engagement at the same time with the bearing-contacts with the conductor from the magnet $24^d$, so that when the contacts 74 and 75 come together the current will flow through the magnets 60 and 78 instead of through the magnet $24^d$, which is of higher resistance. In this form the table is given a rotary motion through a friction driving-gear 84 and bevel-gear 85. When the table is locked by the stem 79, the one friction-disk will turn upon the other until the lock is released. In this form we show a hand-lever 86 to operate the air-valve, if this becomes necessary. In the operation of this form of apparatus the table rotates until the cup is brought into filling position, when the lock will be pressed to place by the spring. The glass then flows down into the cup until it overbalances the weight, when the cup-arm will then be tilted and the main circuit completed. The electromagnet $24^d$ will then actuate the air-valve and simultaneously shunt the current from it through the path of lower resistance including the other two electromagnets. An airblast is thus admitted to quickly cut off the glass, and the table is then immediately released and starts to turn. The lock is held in retracted position until the contact 71 is moved away from the contact 72, when the circuit is broken and the spring-pressed lock travels on the lower surface of the table until the next locking-recess comes into registry with it. The weight is preferably arranged so that it will overbalance at a time when the proper amount of glass has passed the blow-off point.

In the form of apparatus which we show in Figs. 16, 17 two feed-out openings are provided with blow-off devices, through which the glass flows alternately. Thus when the parts are in the position shown in the drawings the cup $13^x$ will receive a charge of hot glass, and the next charge will be received by the cup $13^y$ through the other opening. The cups $13^x$ and the cups $13^y$ are mounted on a rotary table $15^x$, driven by mechanism similar to that already described and controlled by similar electrically-operated devices and circuits, the corresponding parts being designated by the same numerals with the exponent $^x$ applied thereto. The cups $13^x$ are capable of an independent horizontal movement other than rotating with the table, the arms $14^x$ being pivoted upon the table $15^x$, and these arms are arranged to be engaged by a stop 87, mounted on the frame supporting the table $15^x$. A spring $14^y$ normally holds the arms $14^x$ in radial position. As the table $15^x$ is rotated one of the arms $14^x$ strikes the projecting stop 87 and deflects the arm from its radial position, so that it registers with one of the feed-out and blow-off openings, as shown in Fig. 20. The manner in which the cups are filled and the blow-off devices operated is the same as that described in reference to Figs. 14 and 15. As the table $15^x$ is turned a little farther the pin 88 is freed from the cam $15^y$ and the spring $87'$ retracts the stop-pin 87 and through the lever 89 raises the pin 88, at the same time actuating the stem 90 of a plunger-valve 91, so as to bring the other port into communication with the air-supply pipe for the other blow-off, and the table is rotated until the cup $13^y$ is brought into registry therewith, when the filling and blow-off operations are again repeated. The cam $15^y$ resets the valve 91 in the proper position for supplying air for the blow-off employed in feeding the next succeeding cup $13^x$, and the stop-pin 87 is also projected to stop the arm $14^x$ and bring it into proper position. The obtaining the glass from two sources makes it possible to work more rapidly, since the glass at the feed-out opening which supplies one of the cups is getting into condition for a quick discharge during the period of time the other cup is being filled at the other point. This arrangement does not complicate the construction of the apparatus and greatly increases the output.

In Figs. 18 to 21 we show our method of air or gaseous cut-off applied to a suction gathering device. In this form the gathering device consists of a suction-cup 92, having a hinged cover 93, with a suction-slot between them connected to a suction-pipe 94. The lower end of the cup is inclined downwardly and inwardly, so as to form the upper member of the blow-off device, while the lower member 95 is screwed on and provided with a screw-plug 96, having the inclined air-inlet slots. A narrow passage-way is left between the bottom of the cup and the plug, so that the air passing from pipe 97 into the cavity 98 will flow in through the slots and twist and cut off the glass. This device may be used by hand, the operator passing it into the tank, sucking up the glass within the device. He then shuts off the suction and opens the air-valve to allow the blast to cut off the connecting glass as he lifts the device slightly from the bath. The cup is then taken out and the glass dropped into the mold or other receptacle.

The advantages of our invention result from the simple and effective method of cutting off by the blast of fluid, preferably a gaseous fluid, though a liquid may be used. The glass being inclosed on all sides when the cutting-blast is applied, the blast acts quickly and uniformly to cut and twist off the connection, thus doing away with the use of shears, moving shutters, &c., which rapidly deteriorate and burn out. The method is applicable whether the stream flows out of the furnace or the glass is sucked into a cup or taken out in other ways. In all such cases the difficulty has been the severing of the connection, and this difficulty is overcome by our cutting-off method.

Changes may be made in the form of the blow-off device, the gaseous fluid or liquid used, as well as in the other parts of the apparatus, without departing from our invention.

We claim—

1. The method of severing glass, consisting in directing a current of fluid under pressure against the glass while in a molten or plastic condition; substantially as described.

2. The method of severing glass, consisting in directing a current of gaseous fluid under pressure against the glass while in a molten or plastic condition; substantially as described.

3. The method of severing glass, consisting in delivering against the glass while in a molten or plastic condition a current of gaseous fluid under pressure and at such an angle as to cause a swirl; substantially as described.

4. The method of feeding glass from a tank or receptacle, consisting in allowing the glass to flow outwardly through a hole and directing a current of fluid under pressure against the side of said stream to sever it; substantially as described.

5. The method of feeding glass from a tank or receptacle, consisting in allowing the glass to flow out from the same in a stream and directing a current of gaseous fluid under pressure against the side of the stream; substantially as described.

6. The method of severing a stream of molten glass, consisting in driving a current of gaseous fluid under pressure against the molten or plastic glass at a downward angle; substantially as described.

7. The method of severing a stream of molten glass, consisting in driving a current of gaseous fluid under pressure against the molten or plastic glass at a downward angle and a portion of said current in a non-radial direction to cause a swirl; substantially as described.

8. The method of severing a stream of molten glass, consisting in directing streams of gaseous fluid under pressure against different sides of the stream of molten or plastic glass in a non-radial direction; substantially as described.

9. The method of severing a stream of molten glass, consisting in driving against said molten or plastic glass a current of gaseous fluid under pressure in a downward and non-radial direction; substantially as described.

10. The method of severing a stream of molten glass, consisting in confining the stream upon its sides and delivering against the side of the confined stream a thin sheet of gaseous fluid under pressure; substantially as described.

11. The method of severing a stream of molten glass, consisting in allowing the same to flow through a confining-hole and delivering against the side of the stream a series of thin currents of gaseous fluid under pressure; substantially as described.

12. The method of severing a stream of molten glass, consisting in allowing the same to flow through a confining-hole and delivering against the side of the stream a series of thin currents of gaseous fluid under pressure in a non-radial direction; substantially as described.

13. The method of cutting off a stream of glass, consisting in allowing the same to flow through an inclosed hole, directing against the side of the stream within the hole currents of gaseous fluid in a non-radial direction, and allowing the air to flow down around the stream in a thin annular sheet; substantially as described.

14. The method of feeding glass in a tank or receptacle, consisting in allowing the glass to flow outwardly therefrom, automatically admitting a current of gaseous fluid under pressure against the side of the stream to cut it off and then automatically shutting off said gaseous fluid; substantially as described.

15. The method of feeding glass from a tank or receptacle consisting in allowing the molten or plastic glass to flow out in a stream, directing a current of fluid under pressure against the side of the stream to sever it, allowing the glass to flow out from another hole in the receptacle, and cutting it off while the stream in the first-named hole is starting outward; substantially as described.

16. The method of feeding glass in a tank or receptacle consisting in presenting the molds or cups alternately to different outlet-holes in the tank or receptacle, and alternately cutting off the streams of glass by directing a current of fluid against them; substantially as described.

In testimony whereof we have hereunto set our hands.

HENRY L. DIXON.
GEORGE A. MARSH.

Witnesses:
H. M. CORWIN,
GEO. B. BLEMING.